United States Patent
Bruce (10) Patent No.: US 12,446,481 B2
(45) Date of Patent: Oct. 21, 2025

(54) AGRICULTURAL DRILL/PLANTER/COULTER/DISC BLADE WITH STEP PLANE NOTCH EDGE

(71) Applicant: Osmundson Mfg. Co., Perry, IA (US)

(72) Inventor: Douglas G. Bruce, West Des Moines, IA (US)

(73) Assignee: Osmundson Mfg. Co., Perry, IA (US)

( * ) Notice: Subject to any disclaimer, the term of this patent is extended or adjusted under 35 U.S.C. 154(b) by 0 days.

(21) Appl. No.: 18/602,762

(22) Filed: Mar. 12, 2024

(65) Prior Publication Data
US 2024/0298559 A1 Sep. 12, 2024

Related U.S. Application Data (63) Continuation of application No. 16/419,700, filed on May 22, 2019, now Pat. No. 11,944,025.

(51) Int. Cl.
| | |
|---|---|
| *A01B 15/16* | (2006.01) |
| *A01B 7/00* | (2006.01) |
| *A01B 21/08* | (2006.01) |
| *A01B 23/06* | (2006.01) |

(52) U.S. Cl.
CPC .......... *A01B 15/16* (2013.01); *A01B 7/00* (2013.01); *A01B 21/086* (2013.01); *A01B 23/06* (2013.01)

(58) Field of Classification Search
CPC ......... A01B 7/00; A01B 15/16; A01B 21/086; A01B 23/06
See application file for complete search history.

(56) References Cited

U.S. PATENT DOCUMENTS

| | | | |
|---|---|---|---|
| 1,214,882 A | 2/1917 | Bessant | |
| 1,819,950 A | 8/1931 | Leon | |
| 2,749,694 A | 6/1956 | Klemm et al. | |
| 4,016,935 A | 4/1977 | Miller | |
| 4,099,576 A | 7/1978 | Jilani | |
| 4,246,971 A | 1/1981 | Johnson | |
| 4,420,048 A | 12/1983 | Peterson | |
| 11,944,025 B2 * | 4/2024 | Bruce | A01B 21/086 |
| 2008/0264659 A1 | 10/2008 | Hoffman et al. | |
| 2012/0103642 A1 | 5/2012 | Stark | |
| 2015/0289433 A1 | 10/2015 | Sanderson | |
| 2019/0261549 A1 | 8/2019 | Christie | |

FOREIGN PATENT DOCUMENTS

| | | |
|---|---|---|
| EP | 0920794 A2 | 6/1999 |
| EP | 3087815 A1 | 11/2016 |

* cited by examiner

*Primary Examiner* — Christopher J. Novosad
(74) *Attorney, Agent, or Firm* — DENTONS DAVIS BROWN PC; Matthew Warner-Blankenship (57) ABSTRACT

A ground engaging agricultural blade, coulter, or disc having a central opening adapted to be attached to an implement for rotation about a substantially horizontal axis of rotation; the coulter or disc have an outer periphery; and plurality of step plane notches disposed in the outer periphery. The blade can be used with a hub disposed around the central opening or a spacer spool on a shaft extending through the central openings of adjacent blades, the spacer spools extending radially outwardly by a distance.

17 Claims, 13 Drawing Sheets

AGRICULTURAL DRILL/PLANTER/COULTER/DISC BLADE WITH STEP PLANE NOTCH EDGE

CROSS-REFERENCE TO RELATED APPLICATION(S)

This application is a continuation of, and claims priority to U.S. patent application Ser. No. 16/419,700, filed on May 22, 2019, and entitled AGRICULTURAL DRILL/PLANTER/COULTER/DISC BLADE WITH STEP PLANE NOTCH EDGE, which is hereby incorporated herein by reference in its entirety for all purposes.

FIELD OF THE DISCLOSURE

This disclosure relates generally to an improved ground engaging blade for an agricultural implement such as a tillage disc or coulter, drill or planter, and more particularly to such a blade that, due to this shape, resists throwing and provides a consistent cut.

BACKGROUND OF THE DISCLOSURE

Coulters are presently used ahead of no-till implements—such as a planter—to fracture a narrow band of soil to prepare the soil to receive the no-till implement. U.S. Pat. No. 7,497,270 to Bruce, which is incorporated herein by reference in its entirety, shows coulters and one way of how they are used to till and open the soil.

A disc can be a flat coulter that is deformed to a convex shape on one side and concave shape on the other side so it will throw soil in one direction as it moves forwardly through the ground. Discs are most often used with a plurality of them side by side in "gangs" or rows as shown in U.S. Pat. No. 6,554,079 to Bruce, which is incorporated herein by reference in its entirety.

Further, U.S. Pat. No. 8,100,194 to Bruce, which is incorporated herein by reference in its entirety, details that because of differences in soil types and differences among crops grown, there is a need for coulters and discs that can be easily adjusted in shape at the time of manufacture to conform to the conditions anticipated in the field. One such condition is difficult soil types with excess rocks and residue which results in an inconsistent cut made by the coulter or a soil type or crop type in which throwing is disfavored. As such, there is a need in the art for a coulter which provides a consistent cut and reduces throwing.

BRIEF SUMMARY OF THE DISCLOSURE

The disclosure relates to an apparatus for an agricultural implement blade. The blade is a disc or coulter that is generally circular with an outer periphery. A plurality of step plane notches are disposed in the outer periphery of the disc, each of the plurality of step plane notches tapering from a predetermined thickness on a radial inside to a thinner generally sharped edge at the radially outermost part thereof. In one embodiment of the disclosure, each step plane notch has a uniformly deep and sharpened edge so as to provide consistent penetration and residue sizing of the ground with a reduced amount of soil throwing. The disc can be generally curved, a flat coulter, or a disc that is convex on one side and concave on the other side.

BRIEF DESCRIPTION OF THE DRAWINGS

The above needs are at least partially met through provision of the apparatus described in the following detailed description, particularly when studied in conjunction with the drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

In the following detailed description of the embodiments, reference is made to the accompanying drawings which form a part hereof, and in which is shown by way of illustration specific preferred embodiments in which the disclosure may be practiced. These embodiments are described in sufficient detail to enable those skilled in the art to practice the disclosure, and it is to be understood that other embodiments may be utilized and that mechanical, procedural, and other changes may be made without departing from the spirit and scope of the present disclosures. The following detailed description is, therefore, not to be taken in a limiting sense, and the scope of the present disclosure is defined only by the appended claims, along with the full scope of equivalents to which such claims are entitled.

As used herein, the terminology such as vertical, horizontal, top, bottom, front, back, end and sides are referenced according to the views presented. It should be understood, however, that the terms are used only for purposes of description, and are not intended to be used as limitations. Accordingly, orientation of an object or a combination of objects may change without departing from the scope of the disclosure.

Agricultural Blade

As stated above, the agricultural blade apparatus comprises an agricultural blade 10. Each blade 10 may be of any diameter and thickness and may be constructed out of any suitable material. In preferred embodiment, the blade 10 is of a diameter that is preferably 17 inches to 40 inches. In a still further preferred embodiment, the blade 10 is preferably 0.180 inches to 0.5 inches in thickness. However, the agricultural blade may be of any diameter and thickness without departing from the scope of the disclosure. In a still further embodiment, the blade 10 is constructed out of any suitable material, including, but not limited to, metal, steel, hard plastics, and the like. Each blade 10 further comprises an outer periphery 18.

Disc

As stated above, the agricultural blade apparatus comprises an agricultural blade 10. In an embodiment of the agricultural blade apparatus, the agricultural blade 10 is a disc 12, which may be convex on one side and concave on the other side. Each disc 12 may be of any diameter and thickness and may be constructed out of any suitable material. In preferred embodiment, the disc 12 is of a diameter that is preferably 17 inches to 40 inches. In a still further preferred embodiment, the disc 12 is preferably 0.180 inches to 0.5 inches in thickness. However, the disc may be of any diameter and thickness without departing from the scope of the disclosure. In a still further embodiment, the disc 12 is constructed out of any suitable material, including, but not limited to, metal, steel, hard plastics, and the like. Each disc 12 further comprises an outer periphery 18.

Coulter

As stated above, the agricultural blade apparatus comprises an agricultural blade 10. In an embodiment of the agricultural blade apparatus, the agricultural blade 10 is a coulter 14, which is substantially flat. Each coulter 14 may be of any diameter and thickness and may be constructed out of any suitable material. In a preferred embodiment, the coulter 14 is of a diameter that is preferably 17 inches to 40 inches. In a still further preferred embodiment, the coulter 14 is preferably 0.125 inches to 0.5 inches in thickness. In a still further embodiment, the coulter 14 is constructed out of any suitable material, including, but not limited to, metal, steel, hard plastics, and the like. Each coulter 14 further comprises an outer periphery 18.

Step Plane Notch

As stated above, the agricultural blade apparatus comprises an agricultural blade 10. In an embodiment of the agricultural blade apparatus, the agricultural blade 10 further comprises a step plane notch 16, and preferably a plurality of step plane notches 16 disposed in the outer periphery 18 of the agricultural blade 10. In a preferred embodiment, the agricultural blade comprises at least five step plane notches 16. The angle of opening of each notch 16 disposed in the outer periphery 18 is preferably 80 degrees to 135 degrees, or any angle which is suitable for reduction of throwing and promotion of consistent cuts. It is to be understood that the notches 16 can be of other shapes and sizes. It is preferable that each notch 16 be the same shape to promote uniform wear. Further, it is preferable that the plurality of notches 16 are equally spaced in the outer periphery 18. In a preferred embodiment, spacing should be provided such that each third of the agricultural blade 10 contains at least one notch, preferably at least one and half notches, and preferably at least two notches.

Additionally, as stated above, the agricultural blade apparatus comprises an agricultural blade 10 wherein the agricultural blade 10 comprises a step plane notch 16, and preferably a plurality of step plane notches 16 disposed in the outer periphery 18 of the agricultural blade 10. In one arrangement, as one example, the agricultural blade 10 comprises a plurality of step plane notches 16 wherein every other step plane notch 16 is sharpened on the opposite side. In another arrangement, the agricultural blade 10 comprises a plurality of step plane notches 16 wherein every step plane notch 16 is sharpened on both sides. In yet another arrangement, the agricultural blade 10 comprises a plurality of step plane notches 16 wherein every step plane notch 16 is sharpened on the same side. Any variation of sharpening the step plane notches 16 including, but not limited to, every step plane notch 16 being sharpened alike or each step plane notch 16 being sharpened in its own unique manner (i.e., being sharpened on one side, being sharpened on both sides, etc.) may be utilized by the agricultural blade apparatus without departing from the disclosure. Furthermore, the step plane notches 16 remain sharp longer than other blades.

Furthermore, the agricultural blade 10 comprises a plurality of step plane notches 16 which may be uniform in depth 40 and sharpness so that any forces applied to the outer periphery 18 will be transmitted evenly so as to avoid inconsistency in the cut made by the blade 10, whether it is a disc or a coulter. In another embodiment, the agricultural blade 10 comprises a plurality of step plane notches 16 that may vary in depth 40 and sharpness. In one embodiment, the agricultural blade 10 comprises a plurality of step plane notches 16 wherein each step plane notch 16 comprises a depth 40 which is 50% or less of the width 42 of the notch 16. In one embodiment, as one example, the agricultural blade 10 comprises a plurality of step plane notches 16 of varying depths, but each step plane notch 16 comprises a depth 40 which is 50% or less of the width 42 of the respective notch 16.

Central Opening, Shaft, and Axle

Each of the agricultural blades 10 is provided with a central opening 20 which receives the shaft 32. In an alternative embodiment, each of the agricultural blades 10 is provided with a central opening 20 which receives the axle 22. The central opening 20 may be of any suitable size, shape, and design, so as to accommodate receipt of the shaft 32. Similarly, the shaft 32 and axle 22 may be of any suitable size, shape, and design.

Hub

Each of the agricultural blades 10 is provided with a hub 24 which facilitates receipt of the shaft 32 or axle 22. The hub may be of any suitable size, shape, and design.

Spacer Spools

Spacer spool 34 is formed of any suitable size, shape, and design, and is configured to be positioned between adjacent agricultural blades 10 to facilitate proper spacing of the cuts made by the agricultural implement in the soil. Each of the spacer spools 34 comprises a center section and opposite end portions. A shaft opening extends through each of the spacer spools 34. The end portion can be provided with an annular rim or peripheral portion which is slightly convex so as to be complimentary to the inside curvature of the adjacent disc blade 12 or substantially flat so as to be complimentary to the adjacent coulter blade 14. The opposite end portion is also provided with an annular rim or peripheral portion which is slightly concave so as to be complimentary to the outside curvature of the adjacent disc blade 12 or substantially flat so as to be complimentary to the adjacent coulter blade 14. In an alternative embodiment, one end portion may be slightly smaller in diameter than the opposite end portion since it has been found through experience that the agricultural blades 10 suffer less breakage if spools of different diameters are positioned on opposite sides thereof.

Threaded Fastener

Threaded fastener 26 is formed of any suitable size, shape, and design, and is configured to tighten against the surface of the hub 24 while also pulling the agricultural blade 10 into firm engagement with the hub 24. The use of a threaded fastener 26 ensures that a seal is formed with the hub 24 and the agricultural blade 10.

In the arrangement shown, as one example, the threaded fastener 26 is a generally cylindrical elongated member having a first threaded end and a head. First threaded end and head are in coaxial alignment with one another. That is, the center axis of rotation of the first threaded end and head are in alignment with one another, despite the fact that the diameters or shapes or features of the first threaded end and the head may differ. First threaded end and head may have the same diameter or different diameters.

Also shown in this example is a head positioned in the end of the threaded fastener 26. Head is any feature or device that allows for the threaded fastener 26 to be grasped and rotation to be imparted on the threaded fastener 26. In the arrangement shown, as one example, head is generally cylindrical in shape and has a diameter slightly larger than the diameter of the first threaded end. This head includes a plurality of flat surfaces on opposing sides of the head. These flat surfaces allow for a wrench or other tool to grasp the head and impart torque there on. This can be useful during the installation process. It is hereby contemplated for use that head can take on any other form, such as a hex-head member, a square head member, a recessed hexagonal socket, a recessed square socket, a recessed flat head feature that receives a flat head screw driver, a recessed Philips head feature that receives a Phillips head screw driver, a slot, a pair of crossed slots, or any other feature that can be used to impart rotation. In this arrangement, when the first threaded end is inserted within the hub 24, the head extend outward from the hub 24 thereby facilitating easy access to the head. In this arrangement, once the first threaded end is inserted into the hub 24, a tool grasps the head thereby imparting rotation on threaded fastener 26 or preventing rotation of the threaded fastener 26.

Nut

Also shown in this example is a nut 30 positioned in the end of the threaded fastener 26 opposite the head and in coaxial alignment with the head. The nut 30 is any feature or device that allows for the threaded fastener 26 to be grasped and rotation to be imparted on the threaded fastener 26 and remain in firm engagement with the hub 24 and agricultural blade 10. In the arrangement shown, as one example, the nut 30 is generally cylindrical in shape and has a diameter slightly larger than the diameter of the first threaded end. The nut 30 includes a plurality of flat surfaces on opposing sides of the nut 30. These flat surfaces allow for a wrench or other tool to grasp the nut 30 and impart torque there on. This can be useful during the installation process.

It is hereby contemplated for use that nut 30 can take on any other form, such as a hex-head member, a square head member, or any other feature that can be used to impart rotation. In this arrangement, when the first threaded end is inserted within the hub 24 and the nut 30, wherein the nut extend outward from the agricultural blade 10 thereby facilitating easy access to the nut 30. In this arrangement, once the first threaded end is inserted into the nut 30, a tool grasps the nut 30 thereby imparting rotation on nut 30 or preventing rotation of the threaded fastener 26.

In Operation

Figure 12:
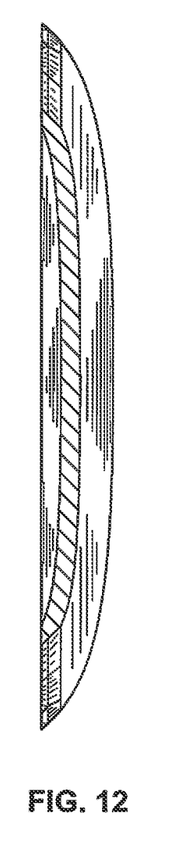
FIG. 12 is a cross sectional view taken along line 13-13 of FIG. 3.
Figure 13:
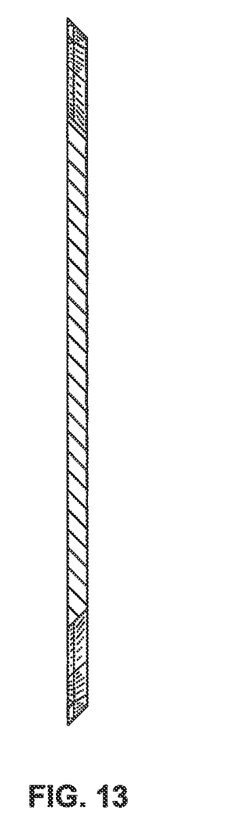
FIG. 13 is a cross sectional view taken along line 15-15 of FIG. 9.

Referring now to FIGS. 1-3 and 12, an agricultural blade 10 has a plurality of step plane notches 16 disposed in the outer periphery 18 of the disc 12 or coulter 14. The cross section shown in FIG. 12 shows a cross section of the disc 12 and step plane notches 16.

Figure 7:
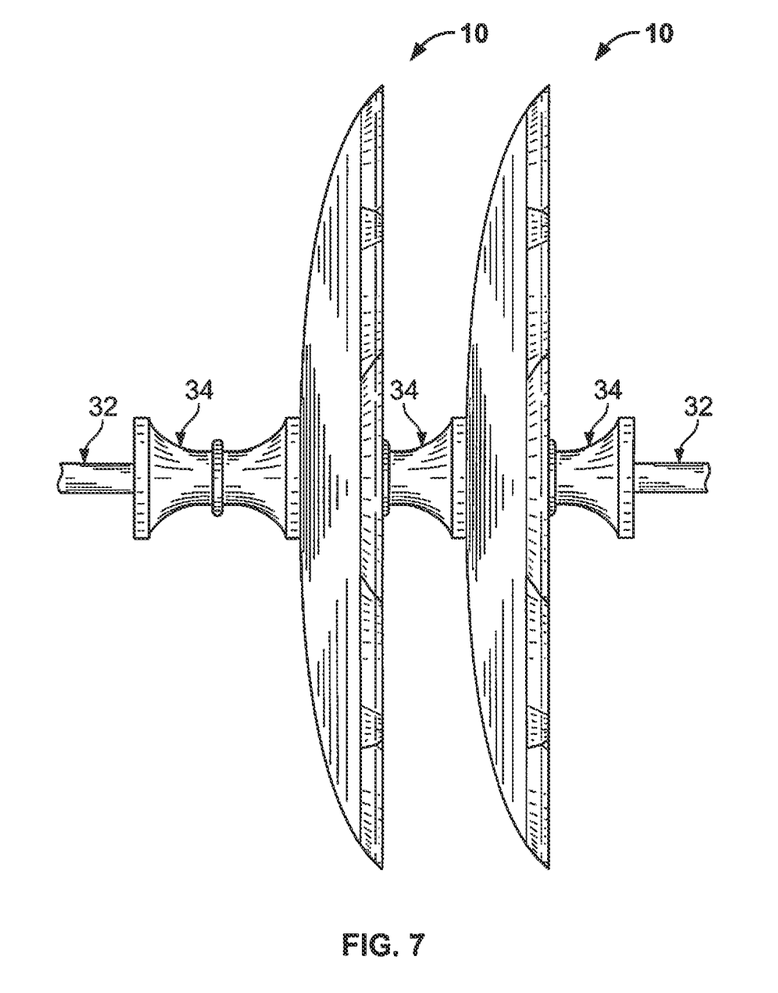
FIG. 7 is a side elevational view of two of the discs of FIGS. 1-3 shown with a spacer spool between adjacent discs.
Figure 8:
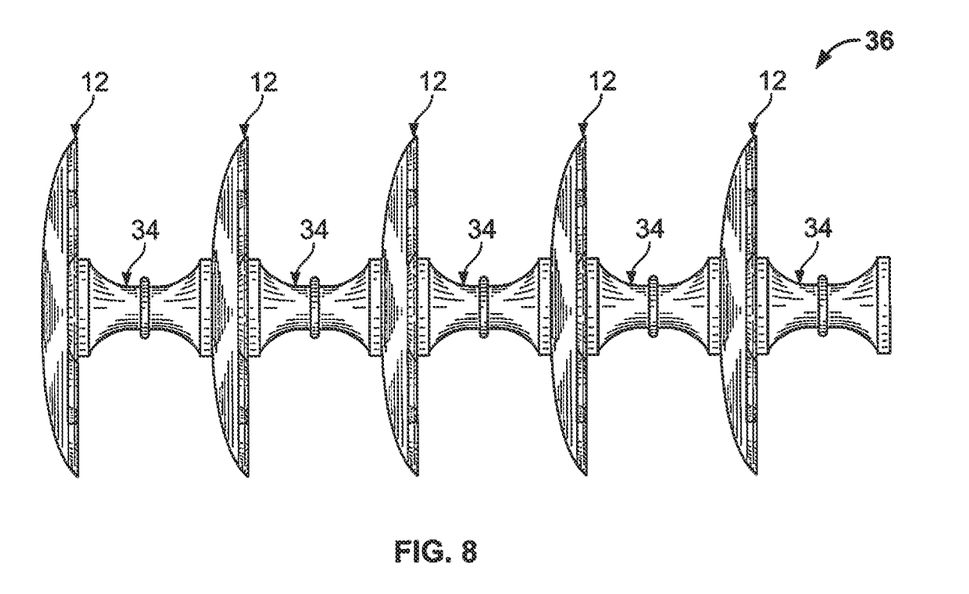
FIG. 8 is a schematic view of part of a gang of discs with spacer spools between adjacent discs showing the direction that the discs throw dirt when pulled through an agricultural field.
Figure 9:
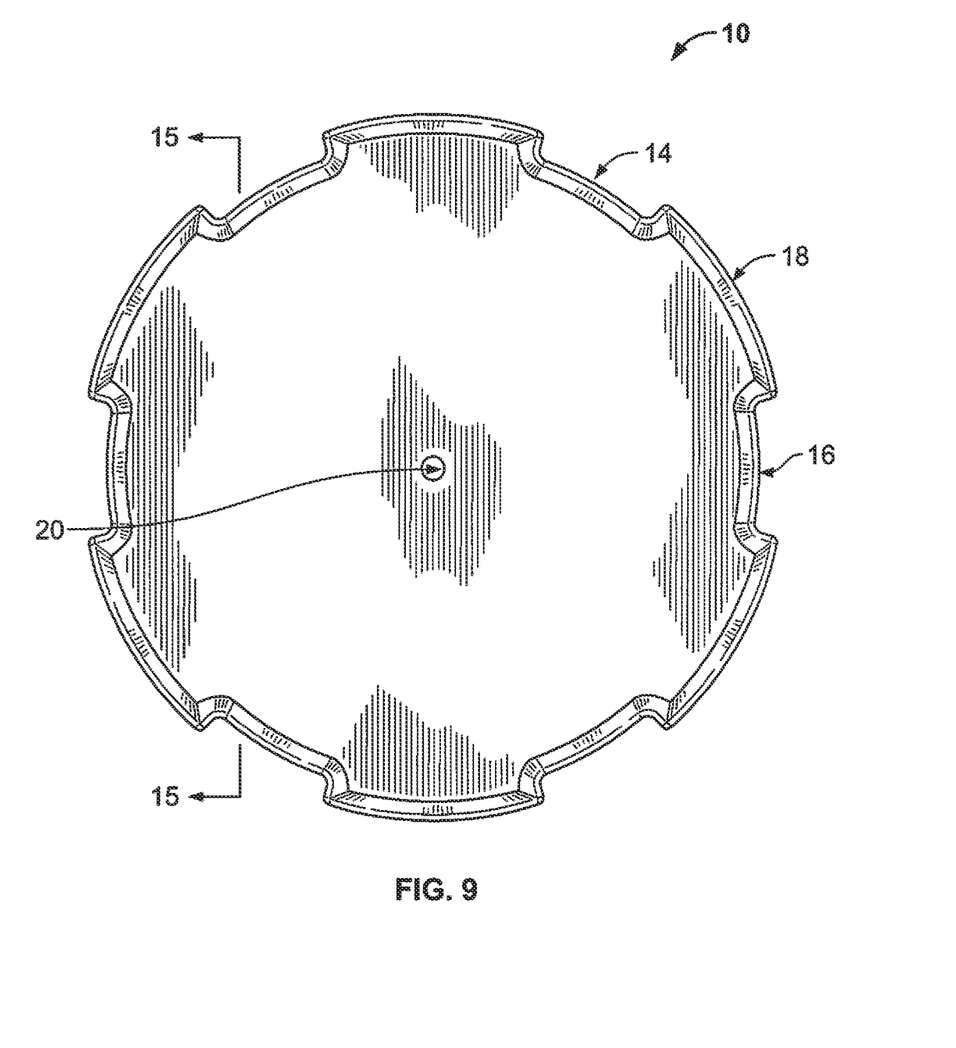
FIG. 9 is a coulter version of the present disclosure.

An important distinction between the agricultural blade 10 and prior art agricultural blades is that the step plane notches 16 are uniform in depth and sharpness so that any forces applied to the outer periphery 18, will be transmitted evenly so as to avoid inconsistency in the cut made by the blade, whether it is a disc or a coulter. In a preferred embodiment, the disc 12 or coulter 14 is connected to a mounting apparatus such as hub 24 (FIGS. 4-6) on bent axle 22 or a spacer spool 34 (FIGS. 7 and 8) that separate and hold in place the discs 12 along a shaft 32 which provides rotation about an axis of rotation. In an embodiment, the axis of rotation is substantially horizontal. The disc gang 36 shown in FIG. 9 or the coulter gang 38 shown in FIG. 12 could have a non-circular center opening with a complementary shaped shaft in the non-circular center opening so that the shaft and discs or coulters all rotate together as a unit. In an embodiment of the disclosure, a spacer spool 34 is disposed on a shaft 32 between two of the discs 12 or between two of the coulters 14 and the spacer spool 34 extends radially outwardly by a distance.

Additionally, as described above, FIG. 1 is a perspective view of a concave/convex disc made in accordance with the disclosure. However, in another embodiment, the side shown of the disc in FIG. 1 may be concave without departing from the disclosure. Furthermore, as described above, FIG. 2 is a perspective view of a concave/convex disc. However, in another embodiment, the side shown of the disc in FIG. 2 may be convex without departing from the disclosure.

Figure 4:
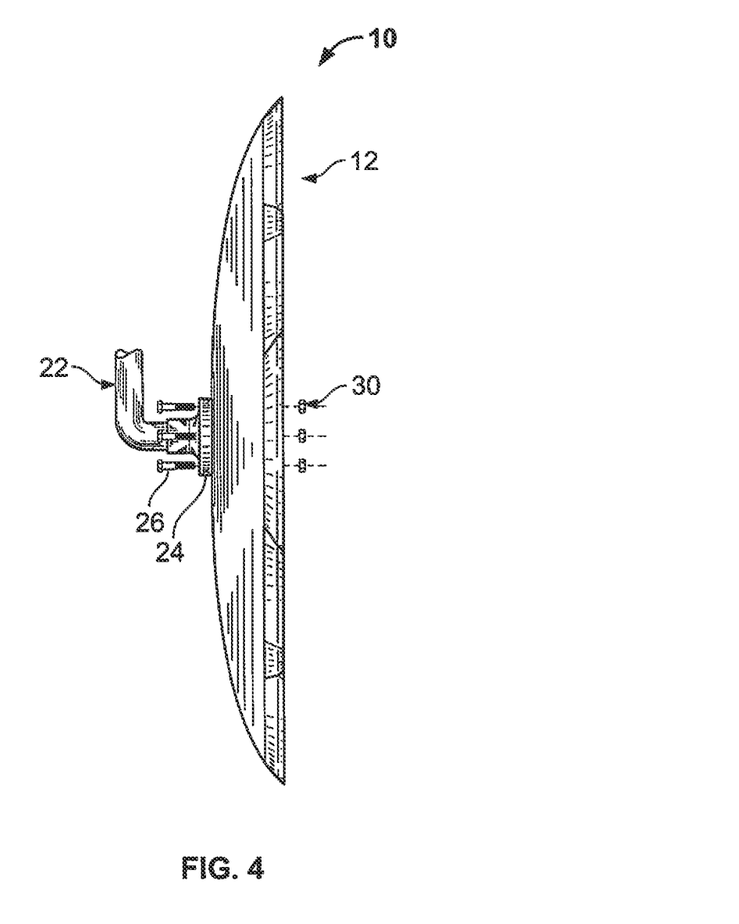
FIG. 4 is a side elevational view of the disc of FIGS. 1-3, but with a hub attached to a bent axle.
Figure 5:
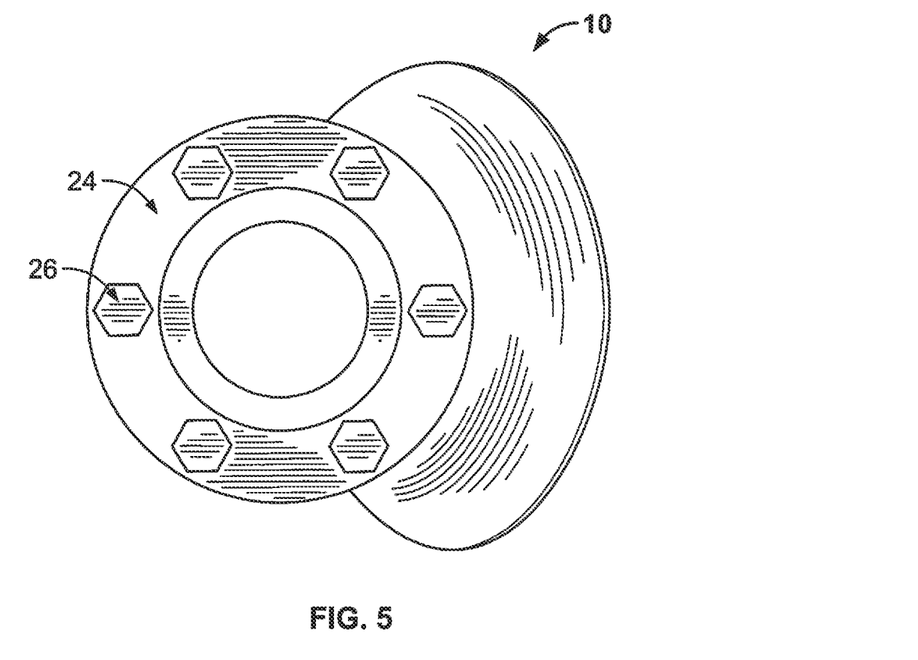
FIG. 5 is an enlarged side elevational view of the hub of FIG. 6 from the left side of FIG. 4.
Figure 6:
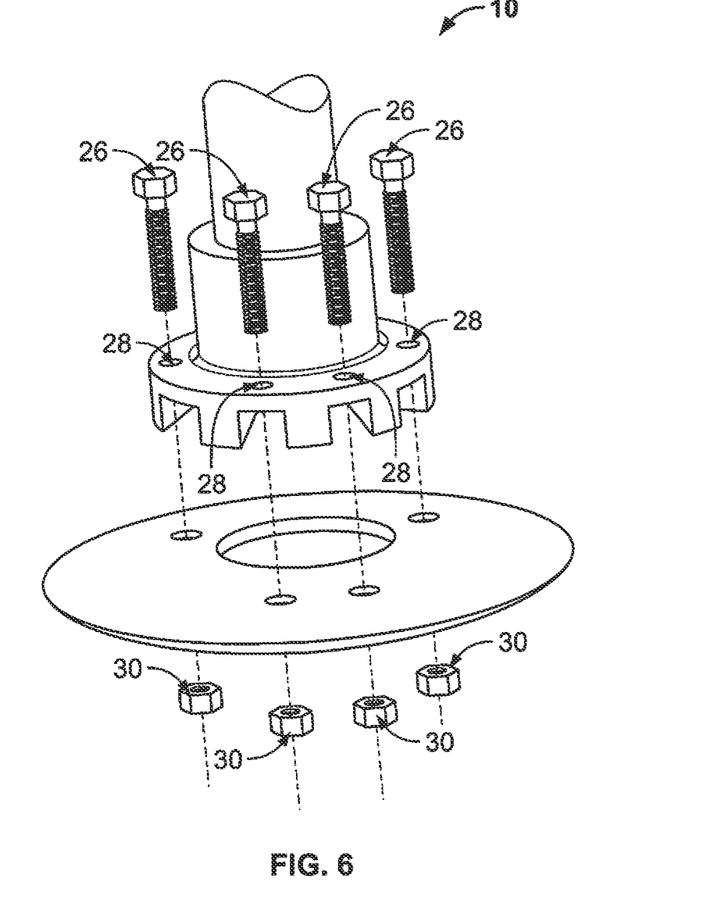
FIG. 6 is an exploded, partial perspective view of the disc and hub shown in FIG. 4.
Figure 10:
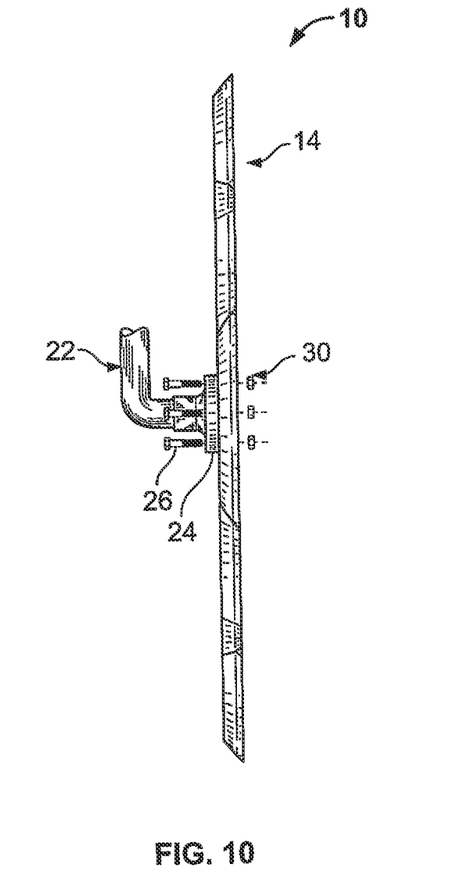
FIG. 10 is a side elevational view of the coulter of FIG. 9 with a hub of the type shown in FIGS. 4-6 attached thereto.
Figure 11:
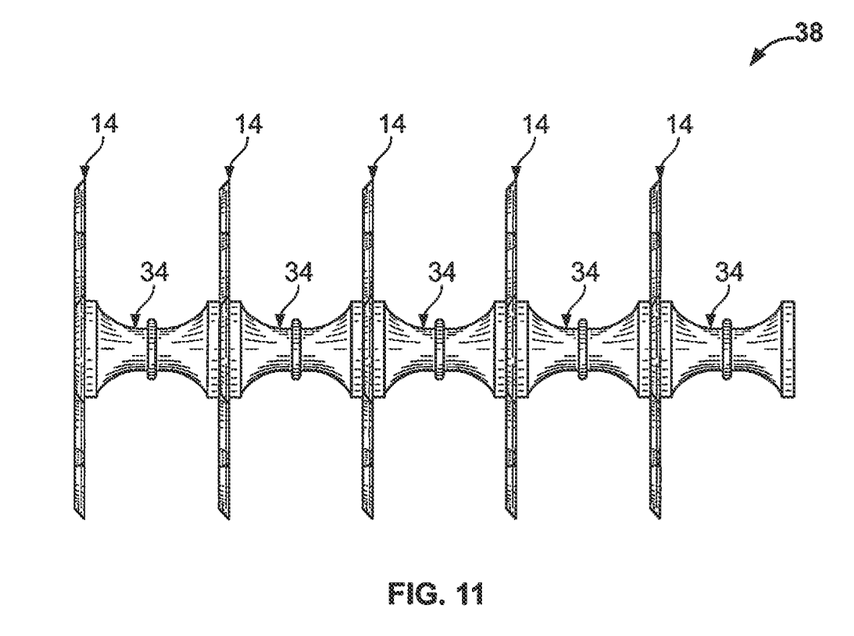
FIG. 11 shows a gang of coulters of the type shown in FIG. 9 disposed on a shaft with spacer spools disposed between adjacent coulters.

FIG. 6 shows that the hub 24 is preferably attached to the disc 12 around a central opening 20 by placing threaded fasteners 26, such as bolts, through substantially aligned holes 28 in the hub 24, through substantially aligned holes 28 extending through the disc 12 or coulter 14 to make sure that the hub 24 is securely fastened to the disc 12. Nuts 30 are threadably attached to the ends of the threaded fasteners 26 to hold the hub 24 to the disc 12. FIGS. 4-6 show that the hub 24 conforms to the surface of the disc 12. The hub 24 shown in FIG. 10 is preferably of the same configuration as that shown in FIGS. 4-6. In an embodiment, the central opening is adapted to be attached to an agricultural implement, such as a disc harrow, disc seeder, or planter.

Figure 1:
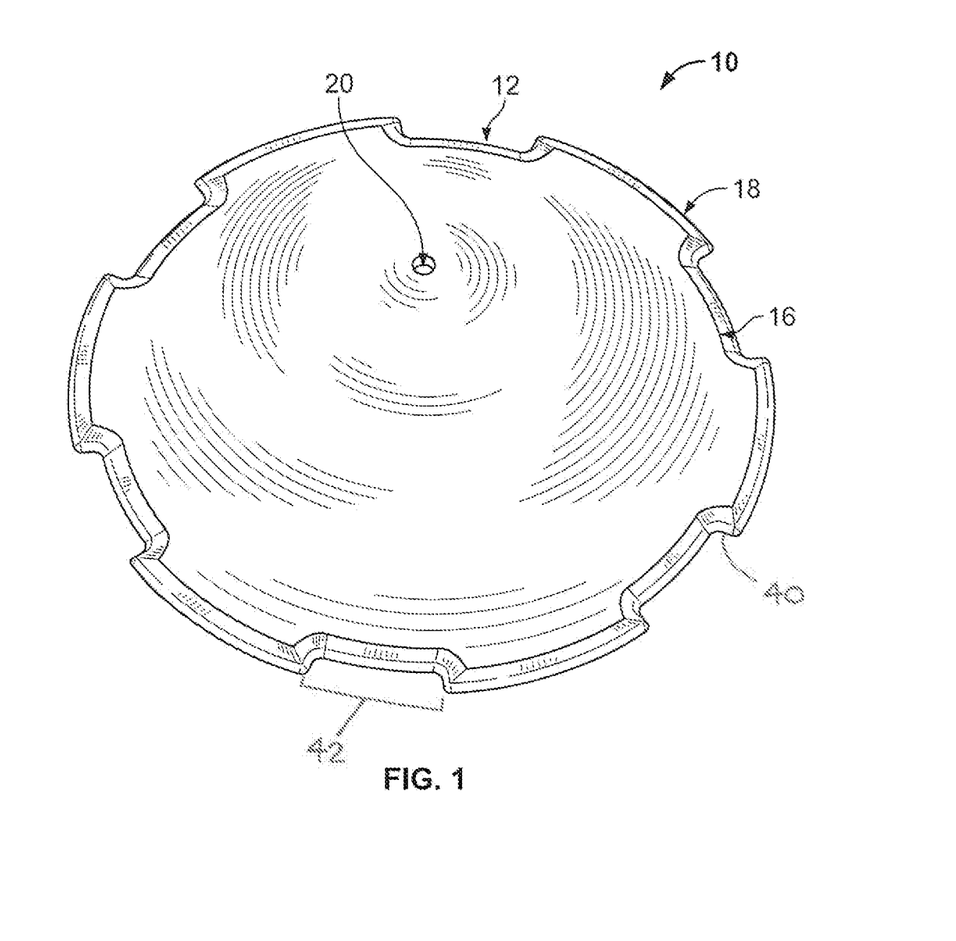
FIG. 1 is a perspective view of the convex side of the concave/convex disc made in accordance with the disclosure.
Figure 2:
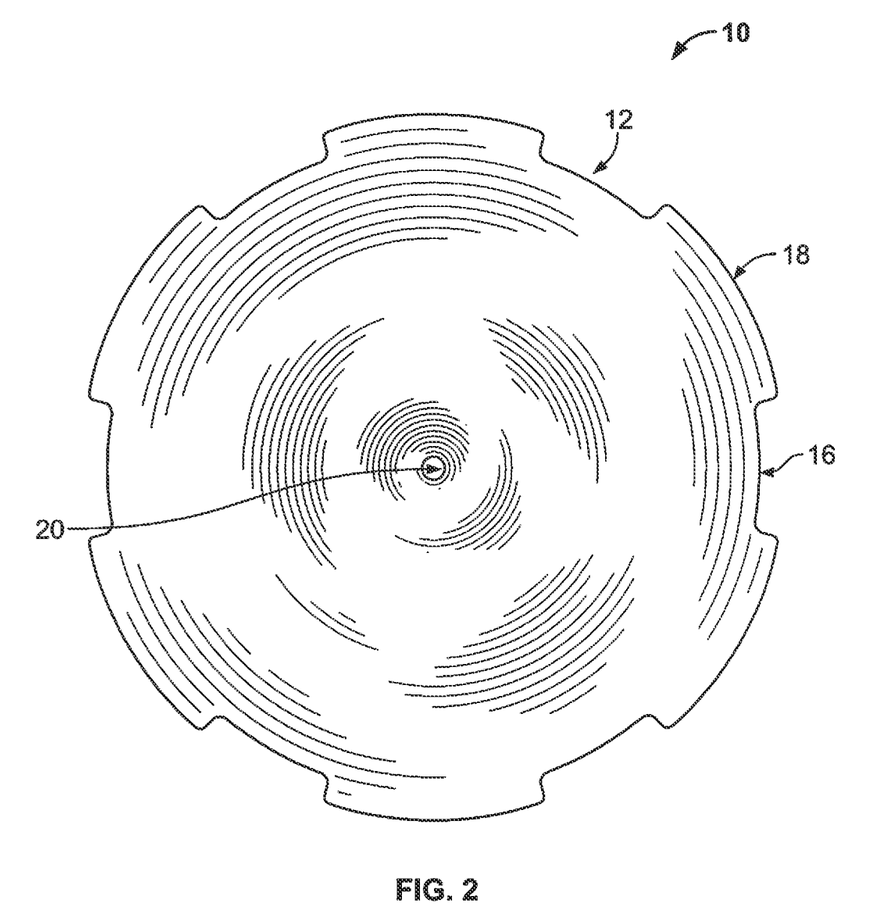
FIG. 2 is a perspective view of the concave side of the disc of FIG. 1.
Figure 3:
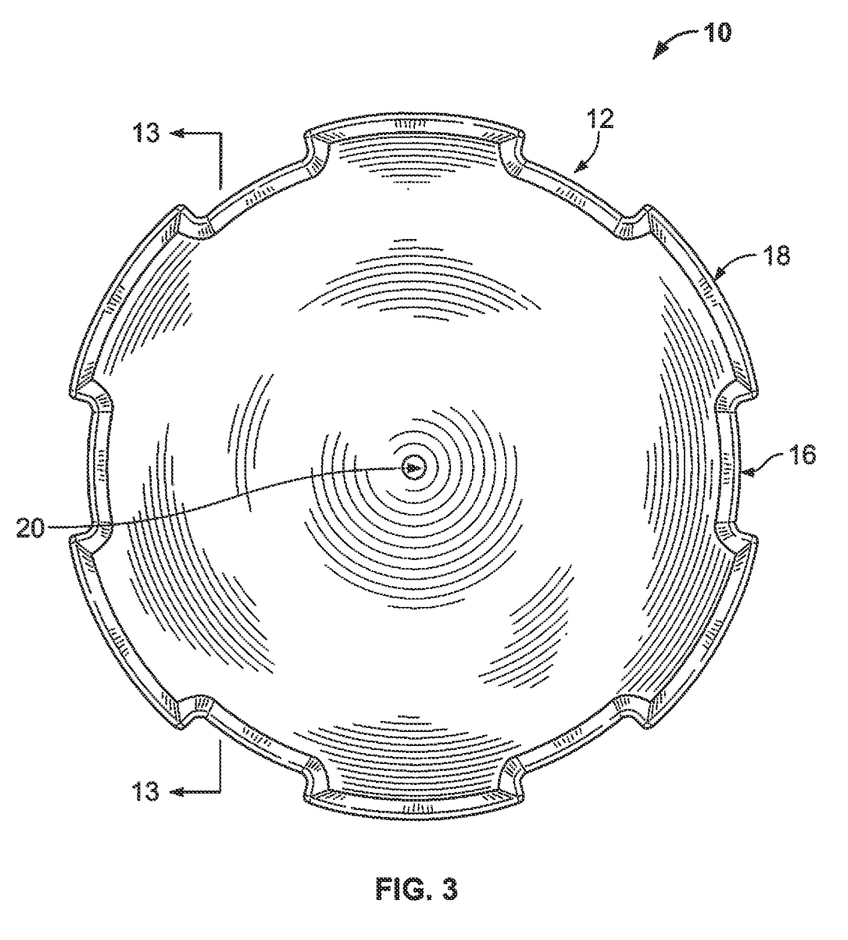
FIG. 3 is a plan view of the convex side of the disc of FIGS. 1 and 2.

A second embodiment of the disclosure, shown by example only, is a coulter 14 shown in FIGS. 9-11 and 13. The only difference between the coulter 14 of FIGS. 9-11 and 13 and the disc 12 of FIGS. 1-3 is that the coulter 14 is primarily flat, whereas the disc 12 may be convex on one side and concave on the other side.

Those skilled in the art will recognize that a wide variety of modifications, alterations, and combinations can be made with respect to the above described embodiments without departing from the spirit and scope of the disclosure, and that such modifications, alterations, and combinations are to be viewed as being within the ambit of the inventive concept as expressed by the attached claims.

What is claimed:

1. A ground engaging agricultural tillage blade comprising:
   a disc having a central opening adapted to be attached to an implement for rotation about an axis of rotation, the disc having an outer periphery extending along a circumference of the disc; and
   a plurality of step plane notches, each with an edge of uniform depth, in the outer periphery of the disc alternating with a plurality of edge segments extending along the disc circumference, each step plane notch comprising a width and a major section comprising a uniform depth,
   wherein:
   i. each edge segment comprises a width that is greater than the depth of each step plane notch,
   ii. the width of each step plane notch is the same, and
   iii. the uniform depth of the major section is the same for each step plane notch.

2. The agricultural tillage blade of claim 1, wherein the uniform depth of the major section of each section of each step plane notch is about 30% or less of the width of the respective notch.

3. The agricultural tillage blade of claim 1, wherein the disc is convex on one side and concave on the other.

4. The agricultural tillage blade of claim 1, wherein a hub is attached to the disc around the central opening.

5. The agricultural tillage blade of claim 4, wherein substantially aligned holes are disposed through the blade and through the hub and threaded fasteners extend through the aligned holes for holding the hub fixed to the blade.

6. The agricultural tillage blade of claim 4, wherein a spacer spool is disposed on a shaft between two of the discs and the spacer spool extends radially outwardly by a distance.

7. A ground engaging agricultural tillage blade apparatus comprising:
   a disc having a central opening adapted to be attached to an implement for rotation about an axis of rotation, the disc comprising an outer periphery extending along a circumference of the disc;
   a plurality of step plane notches, each with an edge of uniform depth, disposed in the outer periphery of the disc alternating with a plurality of edge segments extending along the disc circumference, each step plane notch comprising a width and a major section comprising a uniform depth; and
   a hub being attached to the disc around the central opening,
   wherein:
   i. each edge segment comprises a width that is greater than the depth of each step plane notch,
   ii. the width of each step plane notch is the same, and
   iii. the uniform depth of the major section is the same for each step plane notch.

8. The agricultural tillage blade apparatus of claim 7, wherein substantially aligned holes are disposed through the blade and through the hub and threaded fasteners extend through the aligned holes for holding the hub fixed to the blade.

9. The agricultural tillage blade apparatus of claim 7, further comprising at least two discs.

10. The agricultural tillage blade apparatus of claim 7, wherein a spacer spool is disposed on a shaft between two of the discs and the spacer spool extends radially outwardly by a distance.

11. The agricultural tillage blade apparatus of claim 7, wherein the step plane notches are of varying depths wherein each step plane notch comprises a depth which is 50% or less of the width of the respective notch.

12. The agricultural tillage blade apparatus of claim 9, wherein the disc is convex on one side and concave on the other.

13. A ground engaging agricultural tillage blade apparatus comprising:
   at least two discs, each disc comprising an outer periphery extending along a circumference of the disc and a central opening adapted to be attached to an implement for rotation about a substantially horizontal axis of rotation;
   a plurality of step plane notches, each with an edge of uniform depth, disposed in the outer periphery of each disc alternating with a plurality of edge segments extending along the disc circumference, each step plane notch comprising a width and a major section comprising a uniform depth; and
   a spacer spool disposed on a shaft between the at least two discs, the spacer spool extending radially outwardly from a center opening,
   wherein:
   i. each edge segment comprises a width that is greater than the depth of each step plane notch,
   ii. the width of each step plane notch is the same, and
   iii. the uniform depth of the major section is the same for each step plane notch.

14. The agricultural tillage blade apparatus of claim 13, wherein the step plane notches are of varying depths wherein each step plane notch comprises a depth which is 50% or less of the width of the respective notch.

15. The agricultural tillage blade apparatus of claim 13, wherein each disc is convex on one side and concave on the other.

16. The agricultural tillage blade apparatus of claim 13, wherein a hub is attached to each disc around a central opening.

17. The agricultural tillage blade apparatus of claim 16, wherein substantially aligned holes are disposed through each disc and through the hub and threaded fasteners extend through the aligned holes for holding the hub fixed to each disc.

* * * * *